United States Patent
Chen et al.

(10) Patent No.: US 7,961,422 B1
(45) Date of Patent: Jun. 14, 2011

(54) DISK DRIVE COMPUTING DATA CENTER OFF-TRACK FROM REPEATABLE RUNOUT OF WRITE SERVO TRACK AND READ SERVO TRACK

(75) Inventors: Min Chen, San Leandro, CA (US); Li Yi, Mountain View, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 98 days.

(21) Appl. No.: 12/388,644

(22) Filed: Feb. 19, 2009

(51) Int. Cl.
*G11B 5/596* (2006.01)

(52) U.S. Cl. .................... 360/77.04; 360/77.08

(58) Field of Classification Search .............. None
See application file for complete search history.

(56) References Cited

U.S. PATENT DOCUMENTS

| | | | |
|---|---|---|---|
| 6,510,017 B1 | 1/2003 | Abdelnour | |
| 6,549,362 B1 | 4/2003 | Melrose et al. | |
| 6,657,810 B1 | 12/2003 | Kupferman | |
| 6,965,491 B1 * | 11/2005 | Perlmutter et al. | 360/77.04 |
| 7,304,819 B1 | 12/2007 | Melkote et al. | |
| 7,423,834 B1 * | 9/2008 | Sun et al. | 360/77.04 |
| 7,646,559 B1 * | 1/2010 | Cheung et al. | 360/75 |

* cited by examiner

*Primary Examiner* — Andrew L Sniezek

(57) ABSTRACT

A disk drive is disclosed comprising a disk having a plurality of servo tracks that define a plurality of data tracks, and a head actuated over the disk by a voice coil motor (VCM), wherein the head comprises a read element offset radially from a write element. The read element is positioned over a first servo track and the write element is positioned over a second servo track, and a first repeatable runout (RRO) of the first servo track is measured. The read element is positioned over the second servo track, and a second RRO of the second servo track is measured. A data center off-track is computed in response to the first RRO and the second RRO.

16 Claims, 5 Drawing Sheets

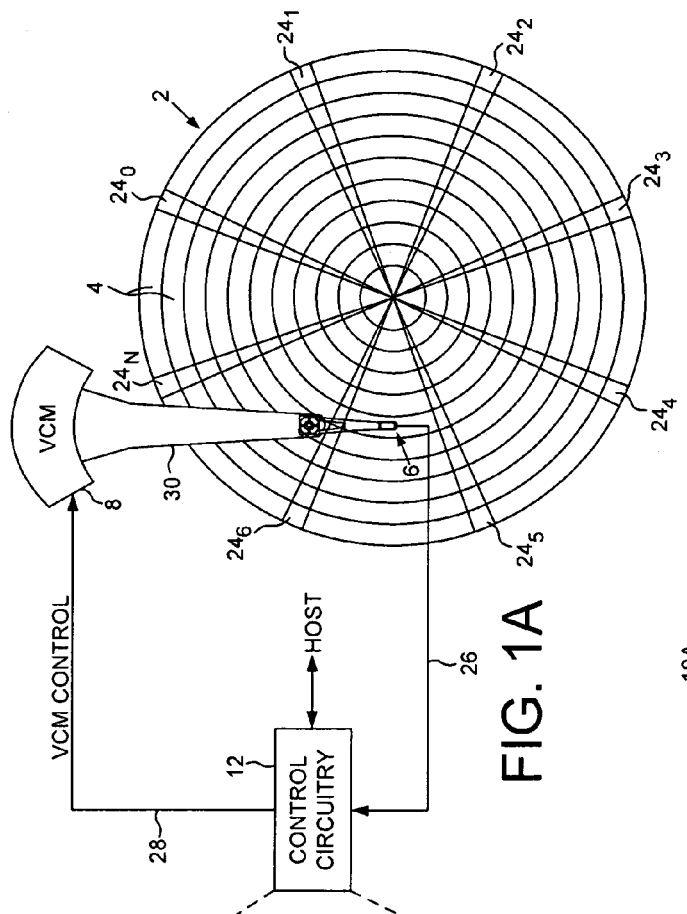
FIG. 1A
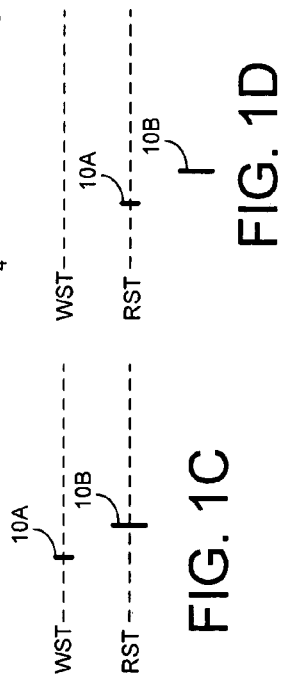
FIG. 1C
FIG. 1D
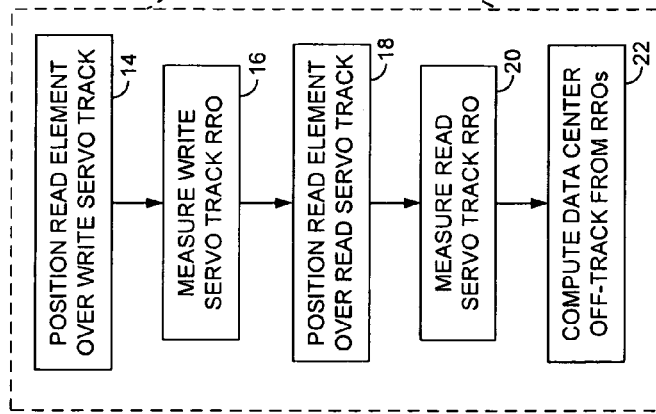
FIG. 1B

US 7,961,422 B1

DISK DRIVE COMPUTING DATA CENTER OFF-TRACK FROM REPEATABLE RUNOUT OF WRITE SERVO TRACK AND READ SERVO TRACK

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address and servo bursts) which is read by the head and processed by a servo control system to control the velocity of the actuator arm as it seeks from track to track.

BRIEF DESCRIPTION OF THE DRAWINGS

FIG. 1A shows a disk drive according to an embodiment of the present invention comprising a disk having a plurality of servo tracks defined by embedded servo sectors, a head actuated over the disk, and control circuitry.

FIG. 1B is a flow diagram executed by the control circuitry according to an embodiment of the present invention wherein a data center off-track is computed in response to repeatable runout (RRO) values measured from a first and second servo track.

FIGS. 1C and 1D show an embodiment of the present invention wherein the first servo track is a write servo track, and the second servo track is a corresponding read servo track.

DETAILED DESCRIPTION OF EMBODIMENTS OF THE INVENTION

Figure 2:
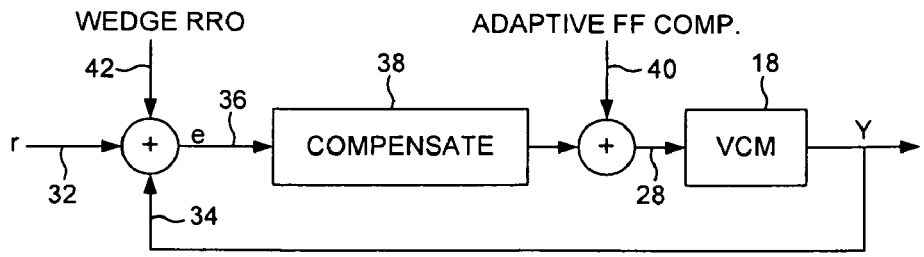
FIG. 2 shows control circuitry according to an embodiment of the present invention for generating a VCM control signal in response to wedge RRO values and adaptive feedforward values.

FIG. 1A shows a disk drive according to an embodiment of the present invention comprising a disk 2 having a plurality of servo tracks 4 that define a plurality of data tracks, and a head 6 actuated over the disk 2 by a voice coil motor (VCM) 8, wherein the head 6 comprises a read element 10A offset radially from a write element 10B. The disk drive further comprises control circuitry 12 operable to execute the flow diagram of FIG. 1B. The read element 10A is positioned (step 14) over a first servo track and the write element is positioned over a second servo track (FIG. 1C), and a first repeatable runout (RRO) of the first servo track is measured (step 16). The read element 10A is positioned (step 18) over the second servo track (FIG. 1D), and a second RRO of the second servo track is measured (step 20). A data center off-track is computed in response to the first RRO and the second RRO (step 22).

In the embodiment of FIG. 1A, the disk 2 comprises a plurality of servo sectors $24_0$-$24_N$ that define the plurality of servo tracks 4. The control circuitry 12 processes the read signal 26 to demodulate the servo sectors $24_0$-$24_N$ into a position error signal. The PES is filtered with a suitable compensation filter to generate a control signal 28 applied to a voice coil motor (VCM) 8 which rotates an actuator arm 30 about a pivot in order to position the head 6 radially over the disk 2 in a direction that reduces the position error signal. The servo sectors $24_0$-$24_N$ may comprise any suitable position information, such as a track address for coarse positioning and servo bursts for fine positioning.

In one embodiment, the read element 10A is offset radially from the write element 10B as illustrated in FIG. 1C, and this offset may vary based on the radial location of the head due to the skew angle. Consequently, during a write operation the read element 10A may be positioned over a first servo track (a write servo track) in order to position the write element 10B over a second servo track (a read servo track). In one embodiment, the center of a data track may correspond with the center of a servo track, and in another embodiment the center of a data track may be offset from the center of a servo track. In either embodiment, the read element 10A may be offset from the center of the write servo track (using a jog value) in order to position the write element 10B over the centerline of a target data track as illustrated in FIG. 1C.

FIG. 2 shows example control circuitry according to an embodiment of the present invention for generating the control signal 28 applied to the VCM 8. A target radial position r 32 of the read element 10A is compared to an estimated position Y 34 of the read element 10A to generate a position error signal e 36. The position error signal e 36 is filtered using a suitable compensation filter 38 to generate the VCM control signal 28. The ability of the control circuitry to maintain the read element 10A over the target radial position depends on the ability to compensate for disturbances in the control loop. In one embodiment, the control loop disturbances are repeatable over a revolution of the disk due, for example, to eccentricities of the servo track (i.e., repeatable runout RRO). In the embodiment of FIG. 2, the low frequency RRO (e.g., the once around or fundamental frequency) is measured and compensated using feedforward values 40 that cause the read element 10A to follow the low frequency RRO so that its affect is not seen in the position error signal e 36. In one embodiment, the feedforward values 40 are adapted during normal operation of the disk drive, for example, by estimating a sinusoidal disturbance in the position error signal e 36. Also in the embodiment of FIG. 2, the higher frequency RRO is measured and compensated using wedge RRO values 42 that are subtracted from the position error signal e 36 so that the read element 10A effectively ignores the higher frequency RRO.

The wedge RRO values measured while servoing on a write servo track (FIG. 1C) may be different from the wedge RRO values measured while servoing on a read servo track (FIG. 1D). The difference between the wedge RRO values for the write/read servo tracks effectively induces a data center off-track when the read element 10A is servoed over the read servo track (FIG. 1D). In the embodiments of the present invention this data center off-track is computed in response to RRO values measured for write/read servo tracks so that appropriate corrective action can be taken, such as relocating a data track if the data center off-track is excessive, or adjusting the wedge RRO values to compensate for the data center off-track.

Figure 3:
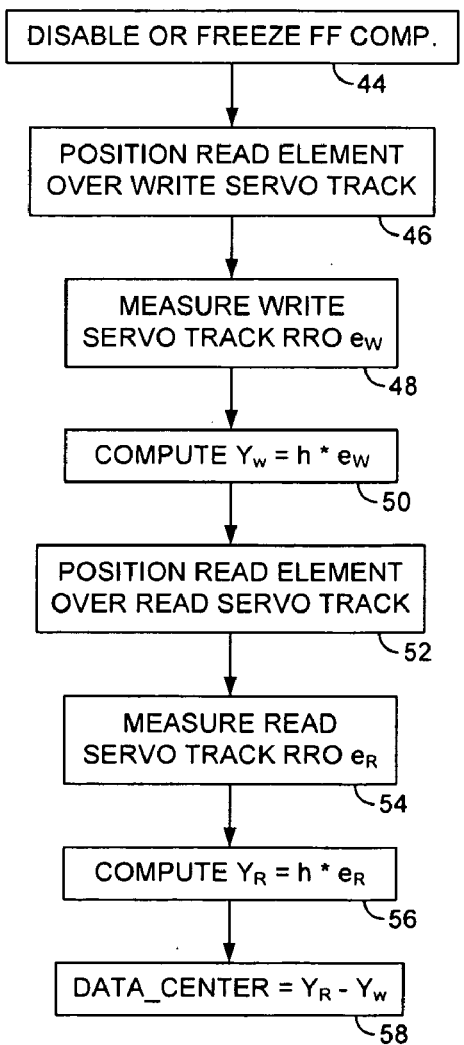
FIG. 3 is a flow diagram according to an embodiment of the present invention wherein the data center off-track is computed by convolving an open loop impulse response of the VCM control loop with write and read servo track RRO values.

Any suitable technique may be employed to compute the data center off-track in response to the RRO values measured for write/read servo tracks. FIG. 3 shows a flow diagram according to an embodiment of the present invention for computing the data center off-track, wherein the adaptive feedforward compensation is disabled or frozen (step 44) so that the feedforward values 40 are either not used or not adapted while computing the data center off-track. The read element is positioned over a write servo track (step 46) and write RRO values are measured for the write servo track (step 48). The write RRO values may be measured in any suitable manner, and in the embodiment of FIG. 3, it is measured by evaluating the position error signal $e_W$. A corresponding affect $Y_W$ on the position of the read element (after generating the VCM control signal 28) is computed (step 50) by convolving the position error signal $e_W$ with the open loop impulse response h of the servo control loop. The open loop impulse response h may be determined in any suitable manner, such as by evaluating the bode response of the servo system within each disk drive. In another embodiment, the open loop impulse response h is estimated using suitable analysis software (such as MATLAB) for a family of disk drives. The read element is positioned over a read servo track (step 52) and read RRO values are measured for the read servo track (step 54). The read RRO values may be measured in any suitable manner, and in the embodiment of FIG. 3, it is measured by evaluating the position error signal $e_R$. A corresponding affect on the position $Y_R$ of the read element (after generating the VCM control signal 28) is computed (step 56) by convolving the position error signal $e_R$ with the open loop impulse response h of the servo control loop. The corresponding data center off-track is then computed (step 58) as the difference between the write position $Y_W$ and the read position $Y_R$ of the read element.

Figure 4:
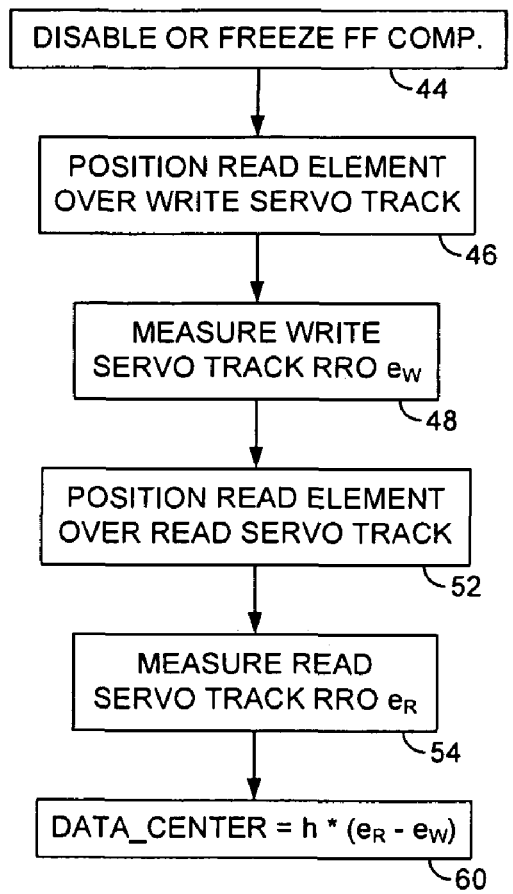
FIG. 4 is a flow diagram according to an embodiment of the present invention wherein the data center off-track is computed by convolving an open loop impulse response of the VCM control loop with a difference between the write and read servo track RRO values.

FIG. 4 is a flow diagram according to an alternative embodiment of the present invention which modifies the embodiment of FIG. 3 wherein the data center off-track is computed by convolving the difference between the error signals ($e_R$-$e_W$) with the open loop impulse response h of the servo control loop (step 60) which is mathematically equivalent to the embodiment of FIG. 3.

Figure 5:
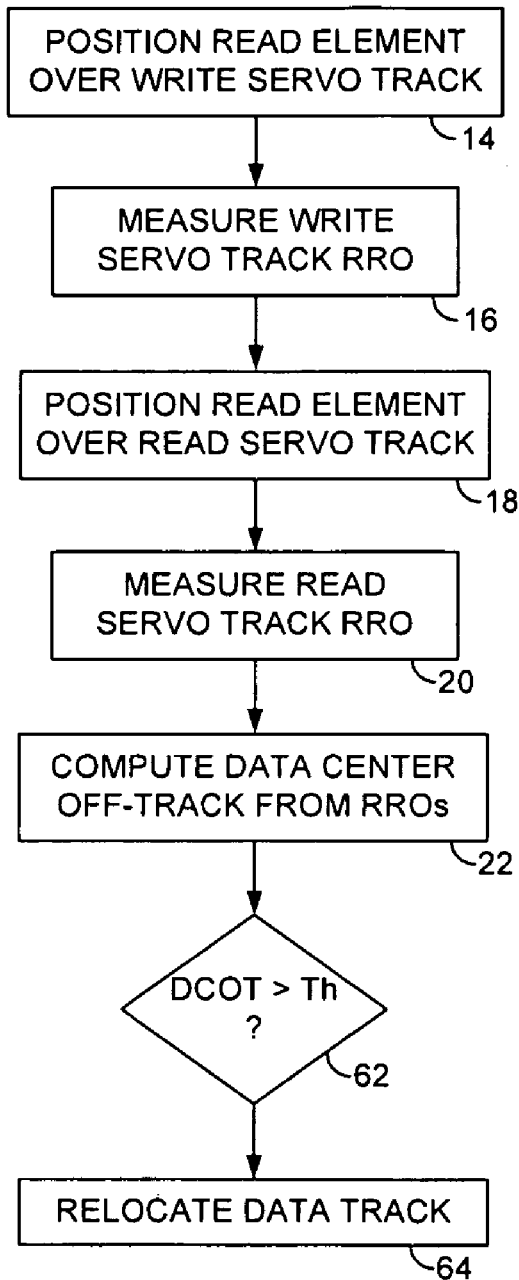
FIG. 5 is a flow diagram according to an embodiment of the present invention wherein a data track is relocated to a spare track when the data center off-track exceeds a threshold.

The data center off-track may be used in any suitable manner in the embodiments of the present invention. FIG. 5 is a flow diagram which extends on the flow diagram of FIG. 1B according to an embodiment wherein if the data center off-track exceeds a threshold (step 62), then the corresponding data track (write data track) is relocated to a spare track (step 64). In this manner, marginal data tracks which may be unrecoverable during normal operation are mapped out of the disk format to prevent data loss.

Figure 6:
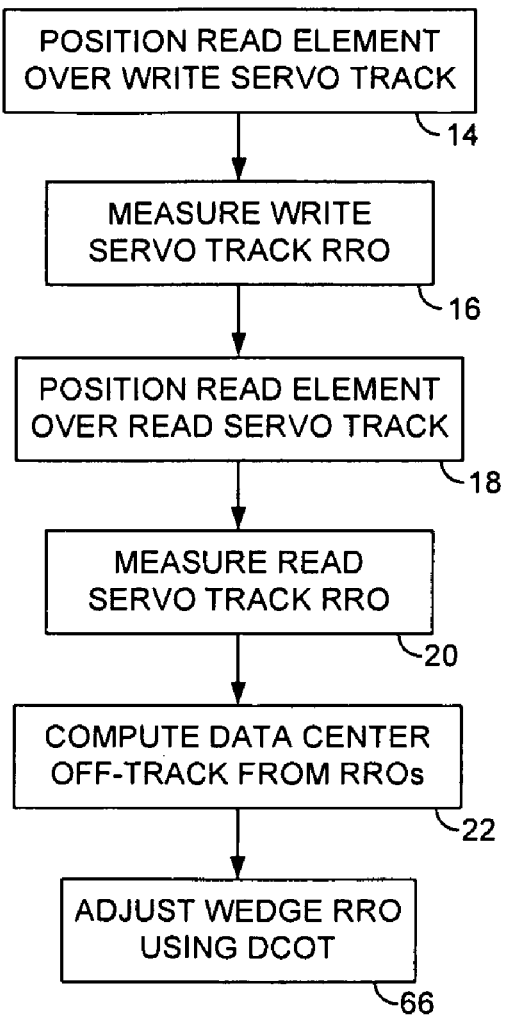
FIG. 6 is a flow diagram according to an embodiment of the present invention wherein the wedge RRO values are adjusted in response to the data center off-track.

In another embodiment shown in the flow diagram of FIG. 6, at least one of the wedge RRO values 42 (FIG. 2) may be modified (step 66) in response to the data center off-track computed in response to the write/read RRO values. The wedge RRO values 42 may be modified for either or both of the write servo track and/or the read servo track. This embodiment may help reduce the resulting data center off-track so that the data track need not be relocated to a spare track. In one embodiment, the process is repeated such that after adjusting the wedge RRO values the data center off-track is recomputed and the wedge RRO values adjusted again. This process may iterate until the data center off-track falls below a threshold, or until the number of iterations exceeds a threshold wherein the data track is relocated to a spare track.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo tracks that define a plurality of data tracks;
    a head actuated over the disk by a voice coil motor (VCM), wherein the head comprises a read element offset radially from a write element; and
    control circuitry operable to:
        position the read element over a first servo track and the write element over a second servo track;
        measure a first repeatable runout (RRO) of the first servo track;
        position the read element over the second servo track;
        measure a second RRO of the second servo track; and
        compute a data center off-track in response to the first RRO and the second RRO.

2. The disk drive as recited in claim 1, wherein the control circuitry is further operable to:
    servo the head in response to feedforward compensation values;
    adapt the feedforward compensation values; and
    disable the feedforward compensation values when measuring the first RRO and the second RRO.

3. The disk drive as recited in claim 1, wherein the control circuitry is further operable to:
    servo the head in response to feedforward compensation values;
        adapt the feedforward compensation values; and
        freeze the adapting of the feedforward compensation values when measuring the first RRO and the second RRO.

4. The disk drive as recited in claim 1, wherein:
    the VCM is controlled according to an approximate open loop impulse response h; and
    the data center off-track is computed in response to the first RRO, the second RRO, and the open loop impulse response h.

5. The disk drive as recited in claim 4, wherein the control circuitry is further operable to:
compute a first position $Y_W$ associated with the movement of the read element while following the first servo track by convolving the open loop impulse response h with the first RRO;
compute a second position $Y_R$ associated with the movement of the read element while following the second servo track by convolving the open loop impulse response h with the first RRO; and
compute the data center off-track as a difference between $Y_W$ and $Y_R$.

6. The disk drive as recited in claim 4, wherein the control circuitry is further operable to compute the data center off-track by convolving the open loop impulse response h with a difference between the first RRO and the second RRO.

7. The disk drive as recited in claim 4, wherein the control circuitry is further operable to relocate at least one of the data tracks to a spare data track when the data center off-track exceeds a threshold.

8. The disk drive as recited in claim 1, wherein the control circuitry is further operable to:
generate wedge RRO values used to compensate for eccentricity when the read element is positioned over at least one of the first and second servo tracks; and
adjust at least one of the wedge RRO values in response to the data center off-track.

9. A method of operating a disk drive, the disk drive comprising a disk comprising a plurality of servo tracks that define a plurality of data tracks, and a head actuated over the disk by a voice coil motor (VCM), wherein the head comprises a read element offset radially from a write element, the method comprising:
positioning the read element over a first servo track and the write element over a second servo track;
measuring a first repeatable runout (RRO) of the first servo track;
positioning the read element over the second servo track;
measuring a second RRO of the second servo track; and
computing a data center off-track in response to the first RRO and the second RRO.

10. The method as recited in claim 9, further comprising:
servoing the head in response to feedforward compensation values;
adapting the feedforward compensation values; and
disabling the feedforward compensation values when measuring the first RRO and the second RRO.

11. The method as recited in claim 9, further comprising:
servoing the head in response to feedforward compensation values;
adapting the feedforward compensation values; and
freezing the adapting of the feedforward compensation values when measuring the first RRO and the second RRO.

12. The method as recited in claim 9, wherein:
the VCM is controlled according to an approximate open loop impulse response h; and
the data center off-track is computed in response to the first RRO, the second RRO, and the open loop impulse response h.

13. The method as recited in claim 12, further comprising:
computing a first position $Y_W$ associated with the movement of the read element while following the first servo track by convolving the open loop impulse response h with the first RRO;
computing a second position $Y_R$ associated with the movement of the read element while following the second servo track by convolving the open loop impulse response h with the first RRO; and
computing the data center off-track as a difference between $Y_W$ and $Y_R$.

14. The method as recited in claim 12, wherein the data center off-track is computed by convolving the open loop impulse response h with a difference between the first RRO and the second RRO.

15. The method as recited in claim 12, further comprising relocating at least one of the data tracks to a spare data track when the data center off-track exceeds a threshold.

16. The method as recited in claim 9, further comprising:
generating wedge RRO values used to compensate for eccentricity when the read element is positioned over at least one of the first and second servo tracks; and
adjusting at least one of the wedge RRO values in response to the data center off-track.

* * * * *